United States Patent [19]

Dorf et al.

[11] Patent Number: 5,048,578

[45] Date of Patent: Sep. 17, 1991

[54] OIL DRAINAGE COUPLER

[76] Inventors: Arkady Dorf, 5442 Castle Manor Dr., San Jose, Calif. 95129; Jamie Wang, 5066 Newtrier Ave., San Jose, Calif. 95136

[21] Appl. No.: 593,331

[22] Filed: Oct. 1, 1990

Related U.S. Application Data

[63] Continuation of Ser. No. 487,752, Mar. 1, 1990, abandoned.

[51] Int. Cl.$^5$ .......................... F16K 15/00; B65B 3/04
[52] U.S. Cl. .................................. 141/346; 184/1.005; 184/106; 184/109; 141/348; 141/351; 141/384
[58] Field of Search .................... 184/1.5, 106, 109; 141/346, 98, 347, 348-351, 384

[56] References Cited

U.S. PATENT DOCUMENTS

| | | | |
|---|---|---|---|
| 1,659,047 | 2/1928 | Quinn | 184/1.5 X |
| 1,818,122 | 8/1931 | Engbrecht | 184/1.5 |
| 1,846,877 | 2/1932 | Knapp | 184/1.5 X |
| 2,811,181 | 10/1957 | Correll | 141/340 |
| 3,387,621 | 6/1968 | Schaff | 184/1.5 X |
| 3,858,686 | 1/1975 | Luterick | 184/1.5 |
| 4,269,237 | 5/1981 | Berger | 141/346 |
| 4,386,639 | 6/1983 | Gable et al. | 141/351 |
| 4,530,421 | 7/1985 | Balch | 184/1.5 |
| 4,709,722 | 12/1987 | Knapp | 184/1.5 |
| 4,776,431 | 10/1988 | Poling | 184/1.5 |

FOREIGN PATENT DOCUMENTS

| | | | |
|---|---|---|---|
| 2816666 | 10/1979 | Fed. Rep. of Germany | 184/1.5 |
| 8602161 | 3/1988 | Netherlands | 184/1.5 |

*Primary Examiner*—Ernest G. Cusick
*Attorney, Agent, or Firm*—Law Offices of Thomas E. Schatzel

[57] ABSTRACT

An oil drainage coupler that enables a single fitting to be coupled to associated oil drainage plugs of various sizes thereby enabling oil to be quickly drained from all makes and models of vehicles. This coupler produces a vacuum-tight seal that enables a vacuum pump to be used to enhance the rate at which oil is drained. The two halves of this coupler can be coupled by a rotation of one half into the other by an angle less than 90°, thereby making this a quick coupler that can be coupled by a single quick motion of vehicle service personnel.

17 Claims, 2 Drawing Sheets

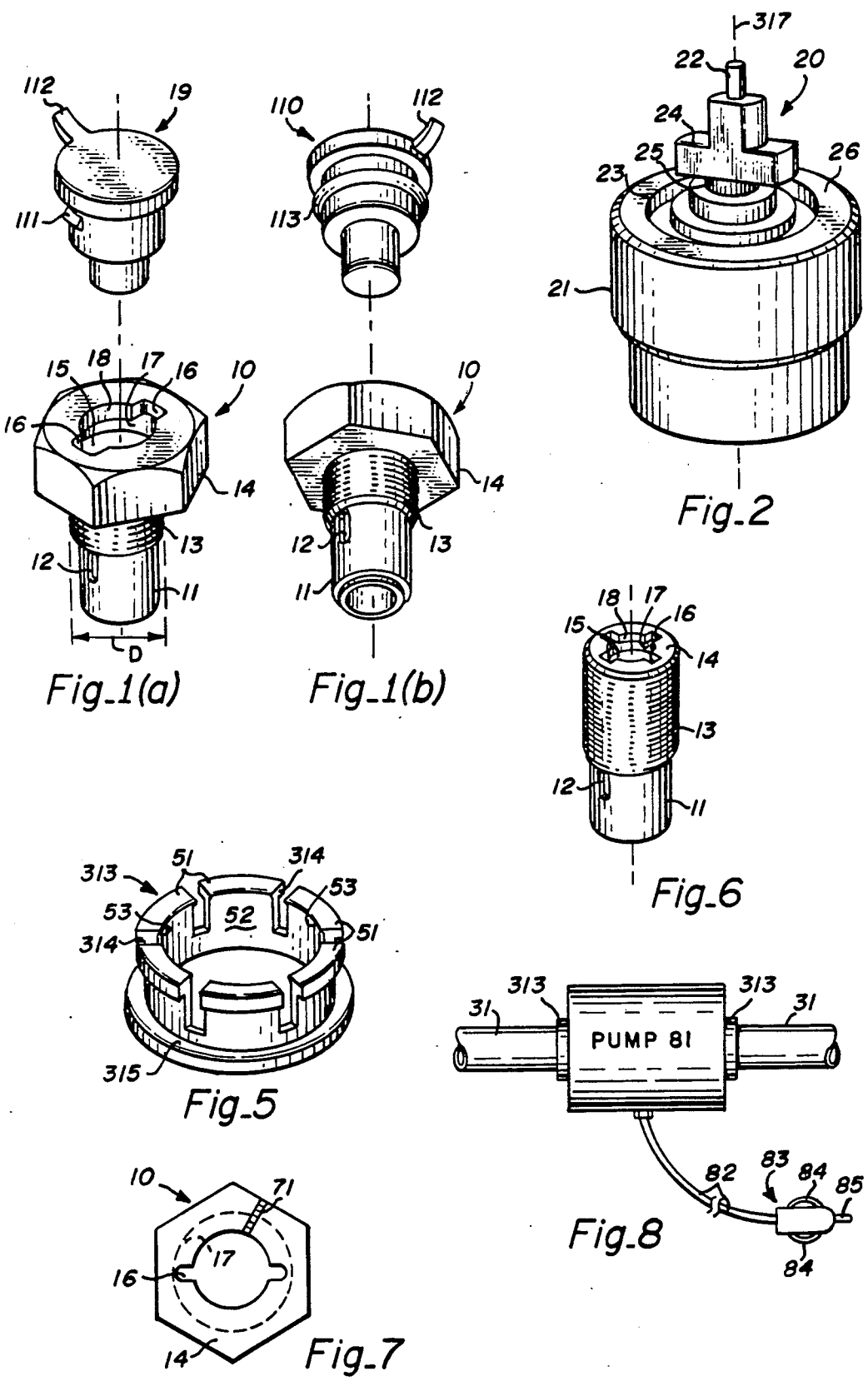

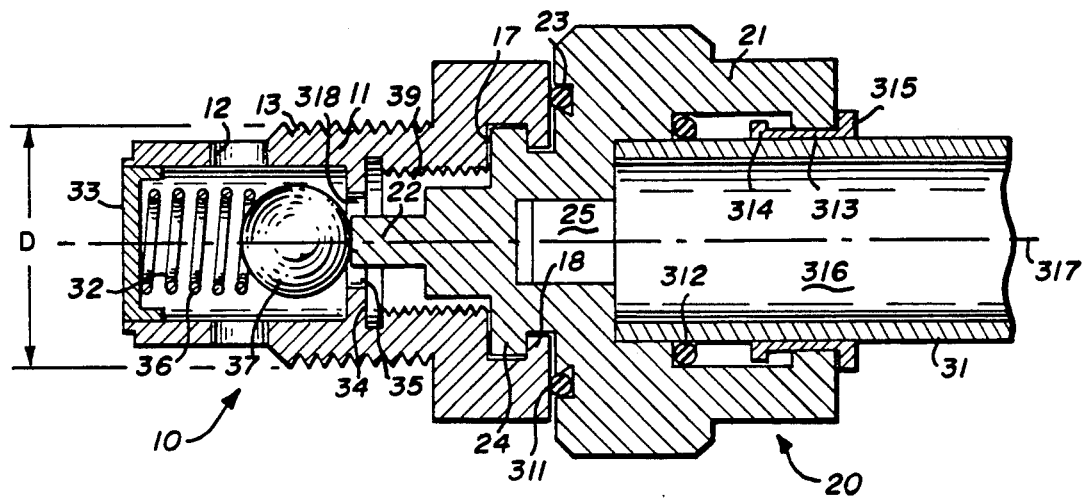
Fig_3
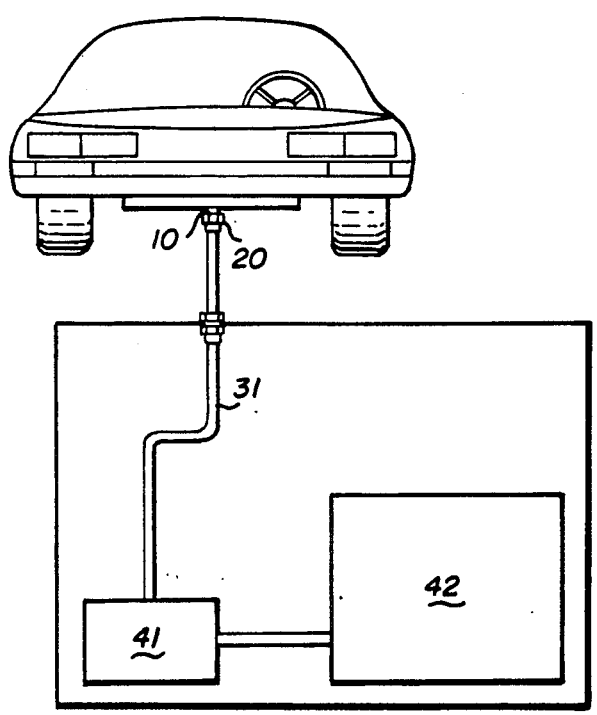
Fig_4

OIL DRAINAGE COUPLER

This is a continuation of copending application(s) Ser. No. 07/487,752 filed on Mar. 1, 1990 now abandoned.

BACKGROUND OF THE INVENTION

This invention relates in general to oil drainage and relates more particularly to an oil drainage coupler that facilitates fast safe drainage of crankcase oil from pans of vehicles such as cars and trucks. This coupler is particularly advantageous for use by vehicle maintenance facilities.

Many oil drainage plugs have been designed to facilitate crankcase oil drainage by the vehicle owner. Because these owners do not typically have access to a hydraulic lift, such changes are often inordinately difficult to perform and are especially difficult to perform without spilling oil. In general, the owner jacks up the vehicle, slides under the vehicle to remove the plug, quickly slides an oil receiver under the oil pan, drains the oil and then replaces the plug. Even if the car is raised on a typical car jack, this process is performed in a cramped space and is difficult to complete without spilling or splashing oil. Therefore, many of these drainage plugs are aimed at simplifying changing of the oil by vehicle owners.

In recent years a number of vehicle service outlets have been established that specialize in fast, inexpensive routine servicing of vehicles. These outlets typically change the crankcase oil, replace the oil filter, top off transmission and differential lubrication and, as needed, replace the air filter. Because of the high volume of customers serviced by these outlets, it is important to quickly drain and store crankcase oil. Such quick drainage and storage of oil would also be advantageous for vehicle repair and service facilities that do not specialize in this narrow line of service.

Some service facilities extract the dirty oil by inserting an oil extraction tube through the motor oil dipstick and then pumping oil out of the crankcase. This procedure is simple, quick and avoids the below-indicated risks of liability, but it drains only about 85% of the oil in the crankcase, leaving behind some of the dirtiest oil located in the bottom of the oil pan.

More typically, crankcase oil is drained by elevating a vehicle on a hydraulic lift, rolling an oil drum underneath the oil pan of the vehicle, removing a drainage plug from the oil pan and allowing the oil to flow out of the oil pan into the oil drum. Typically, in a hole in the top of the oil drum is a large funnel that can be elevated to a height just below the oil pan. This ensures that substantially all of the drained oil winds up in the oil drum and this funnel. The drainage plug is then screwed back into the oil pan and several quarts of oil are poured into the top of the crankcase.

Unfortunately, this procedure is relatively slow and involves a small, but expensive risk to the service facility. If the plug is excessively tighten into the oil pan, then threads in the oil pan can be stripped, thereby exposing the facility to the cost of replacing the oil pan. Even if the service personnel of the facility are skilled and conscientious, these threads could have been damaged in a previous oil change so that proper replacement of the oil pan drainage plug could still strip these threads.

If the oil pan drainage plug is insufficiently tightened, vibration from normal operation of the vehicle can cause the drainage plug to unscrew, thereby enabling the oil to drain out of the crankcase. If this occurs, then there is a significant likelihood of major engine damage. The liability for such a repair is many times the profit made on such service and therefore is a very real risk for such vehicle service facilities. In addition, an unscrupulous customer wanting free major engine repair could intentionally remove the drainage plug and claim that the service facility is responsible. It would therefore be advantageous to have an oil drainage plug that enables oil drainage without unscrewing the oil drainage plug.

It would be advantageous for the plug to be capable of coupling to a fitting on the end of a hose to enable the oil to be drained through the hose into a remote oil receptacle, thereby avoiding the need to roll an oil drum beneath the vehicle. The plug and fitting should connect by means of a quick coupler so that the hose can be simply and quickly coupled and decoupled from the plug. This coupling should be vacuum-tight so that a vacuum-enhanced drainage of oil can be utilized. The plug should fit into the oil pan such that the oil drains through a hole that is substantially flush with the bottom of the oil pan so that substantially all of the oil can be drained from the oil pan. The plug should not extend substantially below the oil pan so that it is not susceptible to breaking off by collision with an obstacle in the roadway. The plug should contain a valve located above the bottom of the oil pan so that if the part of the plug external to the oil pan is broken off, the valve will still keep oil from draining from the oil pan. The coupling should also be simple and rugged to reduce the cost and increase the durability and dependability of the coupling.

The following 6 patents present plugs that do not need to be removed to drain oil from the oil pan, but each lacks at least one of the above-indicated desirable traits for a drainage coupler. In U.S. Pat. No. 4,086,981, the plug is not adapted to couple to any type of fitting, let alone to a vacuum tight, quick coupler type fitting. This plug extends a substantial distance below the oil pan, thereby being subject to damage by road obstacles. The valve portion of this plug is outside of the oil pan so that, if this plug breaks off, oil will drain out of the oil pan. This plug not only has a complex structure, but also requires an expensive procedure to retrofit this plug into existing vehicles.

In U.S. Pat. No. 3,743,053, the plug is coupled to a pump mounted on the vehicle motor to pump oil from the oil pan. This pump adds substantial cost to the system and a retrofit with this plug is complicated and expensive. The plug extends substantially outside of the oil pan and the valve is located partially below the bottom of the oil pan so that if this plug breaks off then oil will drain out of the oil pan. This plug is not adapted to couple to a standard oil drainage system in a service facility so that it is not suitable for use by quick service facilities.

In U.S. Pat. No. 3,967,697, the plug is adapted to couple to a small oil receptacle for oil drainage by the vehicle owner. It is not adapted to couple to a vacuum oil drainage system. Because the drain plug is not removed during oil drainage, the risk of cross-threading the drain plug into the oil drain is eliminated, but this plug is still subject to the risk of over or under tightening the plug after oil drainage. The plug also includes a gasket that can degrade during vehicle operation, producing the risk of eventual leakage past this gasket.

In U.S. Pat. Nos. 4,269,237 and related case 4,373,561, the plug is adapted for drainage by the vehicle owner into a special collecting device. The valve is opened by a spigot of outside diameter substantially equal to the inside diameter of a bore in the oil plug. Therefore, different diameter plugs cannot couple to a single fitting or else all plugs have the same diameter opening which is determined by the smallest diameter plug, thereby limiting the rate of oil drainage. Also, no vacuum tight seal is produced to the spigot. The drainage plug also contains a pair of seals that can not only dry out during vehicle use, but can also be damaged by the spigot that is inserted into the plug to open the oil valve, thereby enabling oil to leak past the valve during normal vehicle operation. The drainage opening in the plug is above the bottom of the oil pan so that the dirtiest oil will not be drained from the oil pan.

In U.S. Pat. No. 4,756,349, no vacuum connection is produced to an associated fitting and the plug extends significantly below the bottom of the oil pan. The valve is opened by a tube of outside diameter substantially equal to the inside diameter of a bore in the oil plug. Therefore, different diameter plugs cannot couple to a single fitting or else all plugs have the same diameter opening which is determined by the smallest diameter plug, thereby limiting the rate of oil drainage. The valve is in the portion of the plug that extends outside of the oil pan and therefore, if this portion in broken off, the oil will drain out of the oil pan.

In U.S. Pat. No. 4,776,430, a drain pipe, connected to a vacuum system, is screwed into the oil plug to remove oil. Thus, threads can be stripped during an oil change and no ability to quick couple a vacuum system to the oil pan is presented. An L-shaped tube extending below the oil pan is at risk to breakage during normal vehicle operation. A rubber seal in the plug can dry out as it ages and allow oil leakage past the valve.

In U.S. Pat. No. 3,720,287, an assembly is screwed into the oil plug to enable a valve in the plug to be opened. These threads can be stripped during oil drainage and no ability to quick couple is provided. Oil drains through holes significantly above the bottom of the oil pan so that the dirtiest oil cannot be drained from the oil pan.

In U.S. Pat. No. 4,745,894, a drainage coupling is provided that can be quickly coupled. However, this coupling is relatively complicated and expensive. In addition, a portion of the valve extends outside of the oil pan so that if this portion is broken off, then oil will drain from the oil pan. Also, the valve includes a cylindrical section that must be pushed up by a mating cylinder in the fitting. Therefore, either each plug size must have an associated sized fitting or else the drain opening of all sizes is limited to the size of the opening in the smallest diameter plug.

In U.S. Pat. No. 4,530,421, the plug extends a significant distance outside of the oil pan and therefore is subject to breakage during vehicle use. The valve is contained in this section so that oil will drain from the oil pan if this section breaks off. The valve is opened by a tube of diameter substantially equal to the diameter of the opening in the plug so that either each plug has an associated sized fitting or the opening diameter is limited to the diameter of the smallest plug. The plug includes a seal that can begin to leak as it ages. No vacuum tight seal is produced to enable a vacuum enahanced rate of drainage.

SUMMARY OF THE INVENTION

In accordance with the illustrated preferred embodiment, an oil drainage coupler is presented that is particularly useful for vehicle service facilities that specialize in performing the routine vehicle maintenance that includes draining and replacing the vehicle's crankcase oil. This coupler consists of a specially designed drainage plug and an associated fitting that is attached to the end of a hose used to drain oil out of the vehicle's oil pan. This hose is preferably coupled to a pump that increases the speed at which oil is drained from the oil pan. The fitting can rotate about the end of the hose so that the fitting can be easily twisted into the plug.

Because different makes and models of vehicles can require different outside diameters of drainage plugs, an equal number of drainage plug sizes are required to enable all makes and models to be adapted. However, regardless of outside diameter, each of these plugs can be quickly coupled to and decoupled from the same associated fitting. It is important that a single fitting can be coupled to all of these different diameter plugs so that no time is wasted in selecting different hoses or exchanging fittings on the end of the hose to adapt it to the different diameter plugs. The plug and associated fitting are both ruggedly designed and constructed so that many vehicles can be serviced before the fitting exhibits any significant wear or damage and so that each plug will last through more oil changes than are likely for any vehicle.

Because there is no need to remove the plug to drain the oil, after initial installation of the plug, subsequent oil changes do not produce any further risk of stripping the threads in the oil pan. Installation of this plug also eliminates the further risk of liability for actual or alleged failure to adequately screw the plug back into the oil pan. Even if the vehicle owner decides to change the oil himself or herself, this is easily achieved by use of a section of hose on which is attached the associated fitting. This hose would facilitate draining the oil into an appropriate container for recycling or disposal and would significantly reduce the risk of spilling oil on the ground.

The drainage plug includes a valve that is normally closed to retain the oil in the oil pan. This plug extends outside of the oil pan by no more than the thickness of a bolt head needed to screw this plug into the oil pan. This thin profile substantially eliminates the risk of an obstacle in the road breaking this plug. In an Allen head embodiment, the plug can be screwed in substantially flush with the outside of the oil pan. Even if this head were broken off without rupturing the oil pan, this valve would protect the engine by preventing oil from leaking out.

The plug and fitting are designed to enable quick coupling and decoupling of the new drainage plug and fitting. This is highly advantageous for a high throughput service facility that drains oil from a large number of vehicles during each day of operation. This coupling is also designed to withstand the vacuum produced by a pump used to increase the speed at which oil is drawn out of a vehicle's oil pan.

The preferred embodiment includes on the fitting one or more lateral projections that can be inserted through a slot in the face of the plug and then rotated into a retaining groove in the plug to produce a vacuum-tight fit between the fitting and the plug. Preferably, there are two of these projections aligned collinearly in a direction perpendicular to an axis of the plug.

On the end of the fitting and aligned along the axis of the fitting is a projection that, when the fitting is coupled to the plug, extends through an oil outlet of the plug and opens the valve to enable oil to be drained from the oil pan. The valve does not contain any compressible washers that can begin to leak with aging and use.

This oil drainage coupling provides the following advantages. It is momentarily interchangeable with existing oil drainage plugs and economically adapts to existing oil evacuation systems. The quick coupling greatly reduces service time. Unlike systems which drain oil through the dip stick or through a plug that provides a drainage opening above the bottom of the oil pan, this plug enables complete drainage of oil from an oil pan. After initial installation, in subsequent oil changes, it eliminates the risk of stripped oil pans and plugs as well as the risk of engine damage due to loss of the drainage plug. It provides a clean oil evacuation process that eliminates oil spills, oil splash and exposure of service technicians to hot oil, all of which violate EPA or OSHA regulations.

These and other objectives and advantages of the present invention will become clear from the detailed description given below in which a preferred embodiment is described in relation to the drawings. The detailed description is presented to illustrate the present invention, but is not intended to limit it.

DESCRIPTION OF THE FIGURES

In the figures, the first digit of a reference numeral indicates the first figure in which is presented the element indicated by that reference numeral.

FIG. 1(a) presents a perspective view of an oil pan drainage plug and a cap to seal the plug during vehicle use.

FIG. 1(b) presents another perspective view of the plug and cap of FIG. 1(a).

FIG. 2 is a fitting that facilitates quick coupling of a hose to the plug of FIGS. 1(a) and 1(b) for spill-free drainage of oil from an oil pan.

FIG. 3 is a cross-sectional view of the elements of FIGS. 1(a), 1(b) and 2, illustrated in mated engagement.

FIG. 4 illustrates the use of the drainage coupler as part of an oil evacuation system.

FIG. 5 is a perspective view of the bushing of FIG. 3.

FIG. 6 is an alternate plug embodiment having an Allen head.

FIG. 7 illustrates an optional pin in the plug that would enable the fitting of FIG. 2 to function as a tool to insert or remove the plug from the oil drainage pan.

FIG. 8 shows a pump that can be used by the vehicle owner to pump used oil out of the oil pan and to pump fresh oil into the oil pan.

DESCRIPTION OF THE PREFERRED EMBODIMENT

FIGS. 1(a), 1(b) and 2 are perspective views of the components of a new oil drainage coupler that is particularly suitable for use by a vehicle service facility that performs a high volume of oil changes. FIGS. 1(a) and 1(b) illustrate an oil pan drainage plug 10 that screws into an oil pan to facilitate changing the oil in that oil pan. FIG. 2 illustrates an associated fitting 20 that can be attached to the end of a hose 31 to enable the hose to be quickly connected to the oil pan. As illustrated in FIG. 4, the hose can be connected through a pump 41 to a waste oil tank 42 that receives the oil from the oil pan. This pump could also be switchably connected to a flush system and/or an oil reservoir to flush the oil pan and/or inject a fresh supply of oil into the oil pan via the drainage coupler.

FIG. 3 illustrates the internal structure of this coupler and illustrates the coupling of the fitting 20 to the drainage plug 10. An outer shell 11, preferably of stainless steel or other material of similar strength, encircles a valve chamber 32 that is closed at a first end by a cap 33 and is partially closed at the other end by a wall 34 in which is an opening such as circular hole 35, the perimeter of which functions as a valve seat 318. This hole is closed by a valve assembly such as the illustrated ball valve consisting of valve spring 36 and ball-shaped valve 37. When no fitting 20 is coupled to plug 10, spring 36 presses ball-shaped valve 37 into valve seat 318 to close hole 35.

This valve assembly is easily assembled by inserting ball-shaped valve 37 and spring 36 into valve chamber 32 before press-fitting cap 33 into the first end of the plug. An oil tight seal between ball-shaped valve 37 and valve seat 318 is assured by urging ball-shaped valve 37 into valve seat 318 to produce an oil-tight seat or by including in hole 35 a compressible grommet against which ball 37 is pressed by spring 36. This grommet can be of many possible materials, including teflon, rubber and nylon. It is preferred to avoid the use of such a compressible grommet because it can begin to leak with aging or use.

A set of threads 13 of diameter D enable this plug to be screwed into a vehicle's oil pan drain hole of diameter D in place of the standard drainage plug. The lateral diameter D, the depth and the pitch of these threads are selected so that this plug can be screwed into a first class of oil pan drainage holes. For other classes of oil pan drainage holes, this diameter, the pitch and/or the depth of the threads may differ from this choice. In the shell 11 is at least one hole 12 that enables oil to flow from the oil pan into chamber 32. This hole is positioned within plug 10 such that it will be substantially flush with the bottom of the oil pan when the plug is fully screwed into the oil pan. This assures that substantially all of the oil in the oil pan can be drained through this plug. Hole 12 is preferably axially elongated so that, for oil pans of varying thickness, at least a portion of the hole will be at the bottom of the oil pan. For a hole with an axially elongated length of ⅛", this plug will be able to drain substantially all of the oil from substantially all oil pans.

As indicated in FIG. 3, when a fitting 20 is coupled to plug 10, an axial projection 22 of the fitting pushes ball 37 away from hole 35 enabling oil to drain through hole 35 into a cavity 39 formed between plug 10 and fitting 20. The oil then flows through a hole 25 into hose 31 for collection in a waste oil reservoir 42.

As illustrated in FIGS. 2 and 3, fitting 20 consists of a unitary shell 21, a pair of O-rings 311 and 312 and a bushing 313 that is illustrated in greater detail in the cross-sectional view in FIG. 5. This bushing contains a set of tines 51 that extend from a ring 52. A pair of ridges 314 and 315 restrain the longitudinal motion of bushing 313 when a hose 31 has been inserted into the bushing. A ridge 53 at the top of each tine bites into the hose resisting its extraction from fitting 20. This bushing 313 between hose 31 and fitting 20 allows the fitting to be easily rotated on the end of the hose 31 so that the hose does not resist rotation of the fitting 20 into the plug 10 to couple together the fitting 20 and the plug 10. The tines 51 can flex inward to enable ridge 314 to be inserted within cavity 316 in fitting 20.

The hose 31 can be quickly and easily removed from the fitting 20 by pressing bushing 313 into fitting 20 and pulling on hose 31. For home use, a small electric powered portable pump 81 (shown in FIG. 8) that can be easily held in one hand can be connected to hose 31 to increase the speed of draining oil from the oil pan. When this pump is connected to hose 31 by means of a quick release coupling like bushing 313, this pump can then be easily disconnected and reconnected to pump fluid toward the oil pan so that oil can be injected into the oil pan through the oil pan drainage hole. This pump is connected to an electrical cord 82 in turn connected to an adapter 83 to provide electrical energy to the pump from the cigarette lighter assembly of the vehicle being serviced. This adapter includes an axially compressible electrical contact 85 and a pair of laterally compressible contacts 84 that make electrical contact with the lighter and anchor the adapter within the lighter.

In all embodiments, hose 31 is preferably sufficiently clear or transluscent that the user can visually detect when the oil has been substantially completely drained from the oil pan. This ability is particularly important in a high volume service operation such as exists in the vehicle service facilities that specialize in routine vehicle maintenance service.

O-ring 311 fits within a circular groove 23 having a trapezoidal crosssection that retains this O-ring in the groove even when the fitting is not coupled to a plug 10. Groove 23 is formed in a front face 26 of fitting 20 so that O-ring 311 produces an oil-tight seal between fitting 20 and plug 10 that prevents oil from leaking out of cavity 39. Because O-ring 311 is located on the fitting instead of the plug, it is not subjected to the heat and wear to which it would be subjected if it were part of the plug. This avoids the need to include within the plug a seal that can begin to leak with age or use. This O-ring is also located conveniently on the face of the fitting so that it can be easily replaced and/or inspected for damage. O-ring 312 forms an oil-tight seal between fitting 20 and hose 31 that prevents oil from leaking between hose 31 and fitting 20.

As illustrated in FIG. 1, plug 10 has a hexagonal head 14 that enables this plug to be tightened into the oil pan drain by use of a socket wrench, end wrench or pneumatic wrench. Only head 14 extends outside of the oil pan so that there is a very low likelihood that an obstacle would break this plug out of the oil pan. Indeed, head 14 has the same profile as most drain plugs that it will replace so that there is no increased in risk of damage to plug 10 compared the plug it replaces.

In an alternate embodiment illustrated in FIG. 6, hexagonal head 14 is replaced with an Allen head that enables this embodiment of the plug to be screwed into the oil pan until it is substantially flush with the bottom of the oil pan. The embodiment with the hexagonal head is preferred because it enables the use of a fitting having larger dimensions than would be allowed by the Allen head embodiment. Such larger dimensions result in a more rugged embodiment without introducing any significant risk of damage to the plug during use in a vehicle.

In head 14 is a coupling cavity 15 into which a pair of lateral projections 24 of fitting 20 are inserted to couple fitting 20 to plug 10. Coupling cavity 15 includes a pair of slots 16 that enable the pair of lateral projections 24 of fitting 20 to be inserted into this opening. Fitting 20 is then rotated relative to plug 10 about an axis 317 to rotate projections 24 into a groove 17 in the sidewall of opening 15, thereby locking fitting 20 to plug 10. Projections 24 should have a width W and thickness T on the order of 3/16 inch to provide sufficient strength and durability needed for long life. In this embodiment, projections 24 have a rectangular cross-section, but could have a different cross-section, such as a circular cross-section.

As illustrated in FIG. 7, a pin 71 can be fitted through a hole in the side of plug 10 to produce a projection into groove 17 (the outer perimeter of which is indicated by the dotted lines) that can function as a stop that enables fitting 20 to be used as a wrench to insert or remove plug 20 from an oil drainage hole. That is, a lateral projection 24 of fitting 20 will be rotated within groove 17 until it comes into contact with pin 71 at which point further rotation of fitting 20 will rotate plug 10 within the oil drainage hole. This pin therefore enables the vehicle service personnel to quickly tighten or remove plug 10 without having to obtain an additional tool. Because fitting 20 will couple to all sizes of plugs, there is no need to select such additional tool to fit the size of the plug.

To be able to retrofit plug 10 into the various makes and models of vehicles, an assortment of plugs 10 are needed having the appropriate lateral diameters of the threaded section 13 of plug 10 as well as the appropriate thread pitches and depths. However, it is important that the portion of plug 10 that couples to fitting 20 be functionally unchanged so that all of these assorted plugs can be coupled to the same fitting. That is, regardless of the diameter D, the depth or the pitch of threads 13, elements 15–18 remain substantially unchanged so that all of these plugs can be coupled to the same fitting. This enables the same hose and fitting to be used to service all vehicles that have been retrofitted with one of plugs 10, thereby avoiding any delay associated with interchanging hoses and/or fittings.

Such compatibility is most easily achieved by retaining the same crosssection of cavity 39 for all of these assorted plugs. In particular, the diameter of groove 17 and slots 16 should be substantially equal and these two diameters along with the diameter of lip 18 should be constant for all plug sizes. Because the projection 22 that presses against ball 37 to open the ball valve is centered on the axis, the diameters of chamber 32, spring 36 and ball 37 can vary without affecting the functionality of the coupled fitting and plug. Therefore, for larger plugs, the diameter of chamber 32 is increased to increase the rate of oil flow through the plug and the dimensions of cavity 39 is kept substantially constant so that a single fitting will couple to each of these differently sized plugs.

FIGS. 1(a) and 1(b) also present two different caps 19 and 110 that can be inserted into coupling cavity 15 to keep dirt out of that opening during vehicle use. These caps also provide secondary protection in that, if plug 10 does begin to leak, if it is closed by one of these caps, then that cap will stop oil from leaking past cavity 39. These caps can be made of plastic, rubber or similar inexpensive, flexible material. Cap 19 includes a pair of tabs 111 that fit into coupling cavity 15 via slots 16 and then are rotated into groove 17 to hold the cap in opening 15. A tab 112 is provided to assist in rotating this cap. Plug 110 includes a compressible ring 113 that compresses as the cap 110 is forced past lip 18 and then expands into groove 17 to hold the cap in opening 15. Tab 112 is then useful for pulling the cap out of this opening.

The coupler of FIG. 3 is a "quick-coupler" in that the fitting can be coupled into the associated plug quickly and simply. A "threadless quick-coupler" is a quick coupler that does not utilize threaded sections to achieve coupling of the two halves of the quick coupler. This threadless quick-coupler can have threads on either half of the quick coupler to attach that half to another element. In FIG. 3, the plug half 10 of the quick coupler has threads that enable it to be screwed into an oil pan. Although the fitting half 20 of the quick coupler has no threads, in other embodiments it could be attached to hose 31 by a threaded coupling. In the embodiment of FIGS. 1-3, the fitting is coupled into the plug by inserting lateral projections 24 of fitting 20 through slots 16 in plug 10 and then twisting the fitting 20 by an angle that is large enough to lock projections 24 into groove 17. Ideally, the angle of rotation of fitting 20 is on the order of 90°. The tension of spring 36 provides frictional resistance to rotation of the fitting, thereby helping to maintain this angle of rotation during the drainage of oil. It is advantageous that vacuum-tight coupling is achieved by a rotation of 90° or less because this amount of rotation can be achieved by a single twist of the wrist of a vehicle serviceman.

The foregoing detailed description is illustrative of the invention and it is to be understood that additional embodiments thereof will be obvious to those skilled in the art. This description, together with those additional embodiments obvious to those skilled in the art, are considered to be within the scope of the invention.

We claim:

1. An oil drainage coupler for engaging an oil pan to facilitate drainage of oil from within the interior of said pan and comprising:

a fitting for attachment to a conduit for passage of oil, the fitting including (a) an axial bore therethrough with an opening about an exterior end of the fitting for passage of oil through the fitting to said conduit, (b) an axial projection projecting from and positioned about said exterior end for opening a valve assembly in an associated plug, said axial projection extending beyond said opening to form a passage for oil about an exterior of said axial projection through said opening, (c) a lateral projection integral with said axial projection, projecting from and positioned about the exterior end of said bore for coupling to said associated plug and (d) a sealant means about an exterior surface of the fitting for providing a sealant to oil when the fitting is coupled to an associated plug;

a plug for engaging an opening within an oil pan and for extending between the exterior of said pan to the interior of said pan, the plug including (e) a valve assembly including biasing means in which a valve is biased into a valve seat to close the valve assembly when the plug is not coupled to the fitting, said valve seat providing an opening for passage of oil when said valve is removed away from said valve seat by said axial projection, with said passage being through said valve seat to said exterior of said axial projection, (f) a shell encompassing said valve assembly about said valve seat, an opening in a lateral wall of said shell to allow passage of oil from said pan to said seat, (g) a cylindrical hollow body having a set of exterior helical threads adapted to thread into a set of threads in a wall of said opening of said oil pan having a first diameter D, and for providing a seal between the plug and said oil pan and (h) a head engaged to said cylindrical body for extending to the exterior of said pan and for positioning in abuttment with said pan about said opening, said head and cylindrical body having formed therethrough a coupling cavity extending to said bore, said cavity being encircled by a side wall in which is formed a first groove intersected by at least one lateral projecting slot through which said lateral projection of the fitting can pass and be rotated into said first groove to couple the fitting to the plug such that said axial projection is postioned collinear with the axis of said helical threads and such that, when the plug is coupled to the fitting, said axial projection urges the valve away from said seat without contacting other portions of the plug and providing for a spacing for passage of oil through said seat and for providing a spacing between said exterior of said axial projection and said cylindrical body, whereby oil may pass through said seat, about said exterior of said axial projection within said cylindrical body and then through said opening to said bore and plugs of various diameters D can couple to the same fitting and provide for a sealed passageway of oil from the interior of said pan to said conduit, thereby enabling a common fitting to be used with various sizes of the plug without limiting the rate of flow of oil through the plug to that of the smallest diameter plugs.

2. The coupler of claim 1 wherein,
said exterior helical threads extend axially beyond said valve seat such that said valve seat is positioned within the exterior surface of said oil pan when the plug and said oil pan are sealed, whereby if any exterior portion of the plug is broken after installation to said oil pan, said valve assembly remains closed.

3. The coupler of claim 1 wherein,
said biasing means includes a compressed spring positioned within said shell and engaging said valve to bias said valve in said seat.

4. The coupler of claim 3 wherein,
said shell is in the form of a cylindrical cup with a closed end wall and an open end with said open end surrounding said valve seat and said shell being positioned substantially coaxial with said opening of said seat; and
said biasing means includes a compressed coil spring substantially coaxial with said shell and engaging said valve and said end wall.

5. The coupler of claim 4 wherein,
said end wall is pressure fit into said shell whereby said spring can be easily assembled into said valve assembly.

6. The coupler of claim 4 wherein,
said lateral opening in said shell is positioned adjacent said open end of said shell whereby when the plug is sealed to said oil pan, said lateral opening is substantially flush with the interior bottom wall of said oil pan.

7. The coupler of claim 6 wherein,
said lateral opening is elongated relative to the axis of said shell whereby for a range of oil pan wall thicknesses, said opening will extend to the bottom wall surface of said oil pan.

8. The coupler of claim 6 wherein, said lateral opening is at least one-half inch in length.

9. The coupler of claim 4 wherein, said valve seat is a circular opening; said compressed coil is a helical spring; and said valve is a spherical member of a diameter greater than that of the internal diameter of said coil and the internal diameter of said seat.

10. The coupler of claim 1 further including, a stop within said first groove to limit the rotation of said lateral projections whereby the fitting may be used to screw and unscrew the plug within said oil pan.

11. The coupler of claim 10 wherein, the stop includes a pin inserted through a mated hole in the plug to firmly hold the pin in place.

12. The coupler of claim 1 wherein, the plug includes an Allen-type head.

13. An oil drainage system for draining oil from an engine to an external container, including
an oil drainage coupler for engaging an oil pan to facilitate drainage of oil from within the interior of said pan, the coupler including;
a fitting for attachment to a conduit for passage of oil, the fitting including (a) an axial bore therethrough with an opening about an exterior end of the fitting for passage of oil through the fitting to said conduit, (b) an axial projection projecting from and positioned about said exterior end for opening a valve assembly in an associated plug, said axial projection extending beyond said opening to form a passage for oil about an exterior of said axial projection through said opening, (c) a lateral projection integral with said axial projection, projecting from and positioned about the exterior of said bore for coupling to said associated plug and (d) a sealant means about an exterior surface of the fitting for providing a sealant to oil when the fitting is coupled to an associated plug;
a plug for engaging an opening within an oil pan and for extending between the exterior of said pan to the interior of said pan, the plug including (e) a valve assembly including biasing means in which a valve is biased into a valve seat to close the valve assembly when the plug is not coupled to the fitting, said valve seat providing an opening for passage of oil when said valve is removed away from said valve seat by said axial projection, with said passage being through said valve seat to said exterior of said axial projection, (f) a shell encompassing said valve assembly about said valve seat, an opening in a lateral wall of said shell to allow passage of oil from said pan to said seat, (g) a cylindrical hollow body having a set of exterior helical threads adapted to thread into a set of threads in a wall of said opening of said oil pan having a first diameter D, and for providing a seal between the plug and said oil pan and (h) a head engaged to said cylindrical body for extending to the exterior of said pan and for positioning in abuttment with said pan about said opening, said head and cylindrical body having formed therethrough a coupling cavity extending to said bore, said cavity being encircled by a side wall in which is formed a first groove intersected by at least one lateral projecting slot through which said lateral projection of the fitting can pass and be rotated into said first groove to couple the fitting to the plug such that said axial projection is postioned collinear with the axis of said helical threads and such that, when the plug is coupled to the fitting, said axial projection urges the valve away from said seat without contacting other portions of the plug and providing for a spacing for passage of oil through said seat and for providing a spacing between said exterior of said axial projection and said cylindrical body, whereby oil may pass through said seat, about said exterior of said axial projection within said cylindrical body and then through said opening to said bore and plugs of various diameters D can couple to the same fitting and provide for a sealed passageway of oil from the interior of said pan to said conduit, thereby enabling a common fitting to be used with various sizes of the plug without limiting the rate of flow of oil through the plug to that of the smallest diameter plugs;
a pump having a first quick-coupler connection at an inlet of the pump for coupling to a first hose and having a second quick-coupler connection at an outlet of the pump for coupling to a second hose;
a first hose coupled to said first quick-coupler and to the fitting; and
a second hose coupled to the second quick-coupler connection and extending to an external oil container.

14. The system of claim 13 wherein, at least one of the hoses is transparent whereby an interface between air and oil in said hose can be observed.

15. The system of claim 13 wherein, the pump is electrically powered and includes an electric cord with an adaptor for connection to an automobile power source.

16. The system of claim 13 further including, a bushing connected to the first hose and to the fitting, the bushing being seated within the fitting and the first hose being seated within the bushing, the bushing including a ridge resting on a ledge within the fitting and including tines whereby the bushing is readily rotatable relative to the fitting and said tines oppose axial movement of the first hose relative to the fitting.

17. An oil drainage system for draining oil from an engine to an external container, including
an oil drainage coupler for engaging an oil pan to facilitate drainage of oil from within the interior of said pan, the coupler including,
a fitting for attachment to a conduit for passage of oil, the fitting including an axial bore therethrough with an opening extending from said bore to the exterior of the fitting for passage of oil through the fitting to said conduit, an axial projection for opening a valve assembly in an associated plug, a lateral projection for coupling to said associated plug, and a sealant means about an exterior surface of the fitting for providing a sealant to oil when the fitting is coupled to an associated plug;
a plug for engaging an opening within an oil pan and for extending between the exterior of said pan to the interior of said pan, the plug including a valve assembly including biasing means in which a valve is biased into a valve seat to close the valve assembly when the plug is not coupled to the fitting, said valve seat providing an opening for passage of oil when said valve is removed from said valve seat by said axial projection, a shell encompassing said valve assembly without said valve seat, an opening in a lateral wall to said shell to allow passage of oil from said pan to said seat, a body having a set of exterior helical threads adapted to thread into a set of threads in a wall of said opening of said oil pan having a first diameter $D_1$, and for providing a seal between the plug and said oil pan and a head for extending to the exterior of said pan, and for positioning in abuttment with said pan about said opening, said head having formed therethrough a coupling cavity extending to said bore, said cavity being encircled by a side wall in which is formed a first groove intersected by at least one laterally projecting slot through whereby said lateral projection of the fitting can pass and be rotated into said first groove to couple the fitting to the plug such that said axial projection is positioned collinear with the axis of said helical threads and such that, when the plug is coupled to the fitting, said axial projection urges the valve away from said seat without contacting other portions of the plug and providing for a spacing for passage of oil through said seat to said axial bore and said head interfaces with said sealant means, whereby plugs of various diameters $D_1$ can couple to the same fitting, and provide for a sealed passageway of oil from the interior of said pan to said conduit, thereby enabling a common fitting to be used with various sizes of the plug without limiting the rate of flow of oil through the plug to that of the smallest diameter plugs;

a pump having a first quick-coupler connection at an inlet of the pump for coupling to a first hose and having a second quick-coupler connection at an outlet of the pump for coupling to a second hose;

a first hose coupled to said first quick-coupler and to the fitting;

a second hose coupled to the second quick-coupler connection and extending to an external oil container; and a bushing connected to the first hose and to the fitting, the bushing being seated within the fitting and the first hose being seated within the bushing, the bushing including a ridge resting on a ledge within the fitting and including tines whereby the bushing is readily rotatable relative to the fitting and said tines oppose axial movement of the first hose relative to the fitting.

* * * * *